(12) United States Patent
Spies et al.

(10) Patent No.: US 7,168,011 B2
(45) Date of Patent: Jan. 23, 2007

(54) ERROR-TOLERANT CONNECTION TEST

(75) Inventors: Jörgen Spies, München (DE); Birgit Wuttke, Germering (DE)

(73) Assignee: Siemens Aktiengesellschaft, Munich (DE)

( * ) Notice: Subject to any disclaimer, the term of this patent is extended or adjusted under 35 U.S.C. 154(b) by 574 days.

(21) Appl. No.: 10/738,536

(22) Filed: Dec. 17, 2003

(65) Prior Publication Data

US 2004/0201382 A1 Oct. 14, 2004

Related U.S. Application Data

(63) Continuation of application No. PCT/DE02/01851, filed on May 22, 2002.

(30) Foreign Application Priority Data

Jun. 29, 2001 (DE) .............................. 101 31 533

(51) Int. Cl.
   *G06F 11/00* (2006.01)
(52) U.S. Cl. .................. 714/43; 714/712; 370/248
(58) Field of Classification Search .................. 714/43, 714/4, 712; 370/242, 248
   See application file for complete search history.

(56) References Cited

U.S. PATENT DOCUMENTS

| | | | | |
|---|---|---|---|---|
| 5,712,856 A | * | 1/1998 | Finney et al. ................ | 714/712 |
| 5,715,238 A | * | 2/1998 | Hall et al. .................... | 370/242 |
| 5,809,226 A | * | 9/1998 | Baldwin et al. .............. | 714/43 |
| 6,157,615 A | * | 12/2000 | Akagawa et al. ........... | 370/241 |
| 6,804,712 B1 | * | 10/2004 | Kracht ......................... | 709/223 |
| 6,816,462 B1 | * | 11/2004 | Booth et al. ................. | 370/248 |
| 2002/0126660 A1 | * | 9/2002 | Watanabe et al. ........... | 370/364 |

FOREIGN PATENT DOCUMENTS

| | | |
|---|---|---|
| DE | 198 36 560 A1 | 2/2000 |
| EP | 0 347 360 A2 | 12/1989 |
| EP | 0 403 414 A2 | 12/1990 |
| EP | 0 909 056 A2 | 4/1999 |
| FR | 2 694 466 A1 | 2/1994 |

* cited by examiner

*Primary Examiner*—Robert Beausoliel
*Assistant Examiner*—Marc Duncan

(57) ABSTRACT

The invention relates to a test arrangement and a test method in a node of a communication network for testing communication connections to other modes in the communication network, in which test messages (SLTM) are sent to the partner nodes and an evaluation of the communication connections to the partner nodes is made on the basis of the received replies (SLTA) from the partner nodes to the sent test messages (SLTM). To prevent erroneous interpretations, internal system information on the nodes, for example, data losses during the test as a result of a buffer memory overflow, are taken into account during the evaluation.

10 Claims, 2 Drawing Sheets

ERROR-TOLERANT CONNECTION TEST

CROSS REFERENCE TO RELATED APPLICATIONS

This application is a continuation of International Application No. PCT/DE02/01 851, filed May 22, 2002 and claims the benefit thereof. The International Application claims the benefits of German application No. 10131533.3 filed Jun. 29, 2001, both of the applications are incorporated by reference herein in their entirety.

FIELD OF THE INVENTION

The present invention relates to a test arrangement and a test method in a node of a communication network for testing communication connections to other nodes in the communication network.

BACKGROUND OF THE INVENTION

In communication networks, test signals or test messages are exchanged between the nodes of the network when establishing and during operation of connections, for example in Internet connections or connections to the signaling system no. 7 (SS7 protocol). This involves testing, for instance, whether the connection between two nodes is still physically present, whether the transmission quality of the connection is acceptable and whether there is data consistency between the two nodes. If the test fails, the connection is normally cleared and, for example, re-established via other nodes. Such a connection changeover involves very complex control and signaling procedures, which load the network heavily, in particular if the node is already heavily loaded by high message traffic.

In a test, a node sends test messages via the existing connection to another node, and receives from this node a response to this or an acknowledgement of its test message. Owing to internal problems in a node, it can happen that an incoming response or an acknowledgement cannot be evaluated. For example, if an overload occurs in a node because more messages are arriving than can be processed, message loss may occur and the received acknowledgement may be lost. Furthermore, it is possible that the test message to be sent is lost within the node and is not even sent. The lack of a response to the sent test message, however, can lead to the conclusion that the connection no longer physically exists, whereupon the connection is cleared even though the connection may not be at fault.

To overcome this problem, it is known to send the test message a second time after a wait time t in the absence of a response to a test message, as is specified, for example, in the ITU standard in Specification Q.707 for the periodic link test.

SUMMARY OF THE INVENTION

The object of the invention is to create a test method and a test arrangement in a node of a communication network for testing communication connections to other nodes in the communication network that can increase the availability of the tested communication connection.

This object is achieved according to the features of claim 1 and 5 respectively. Accordingly, before initiating clearance of the tested connection, a check is made whether a data loss has occurred within the node when sending the test message or receiving the response to the test message, and clearance of the connection is not initiated if a data loss has been detected. According to the present invention, important internal system information for the node that indicates a data loss, such as an overflow of the data buffer for example, is included in the evaluation of the network connection. This can prevent misinterpretations, increase the availability of the connection and prevent the connection being cleared unnecessarily in the absence of the response to a sent test message. System information for the partner node can also be included for evaluating the network connection. The test procedure can be implemented in a simple way in the appropriate software functional units of a node.

Further developments of the invention are given by the features of the dependent claims.

BRIEF DESCRIPTION OF THE DRAWINGS

The present invention is explained in more detail below from examples with reference to the enclosed drawings, in which.

DETAILED DESCRIPTION OF INVENTION

Figure 1:
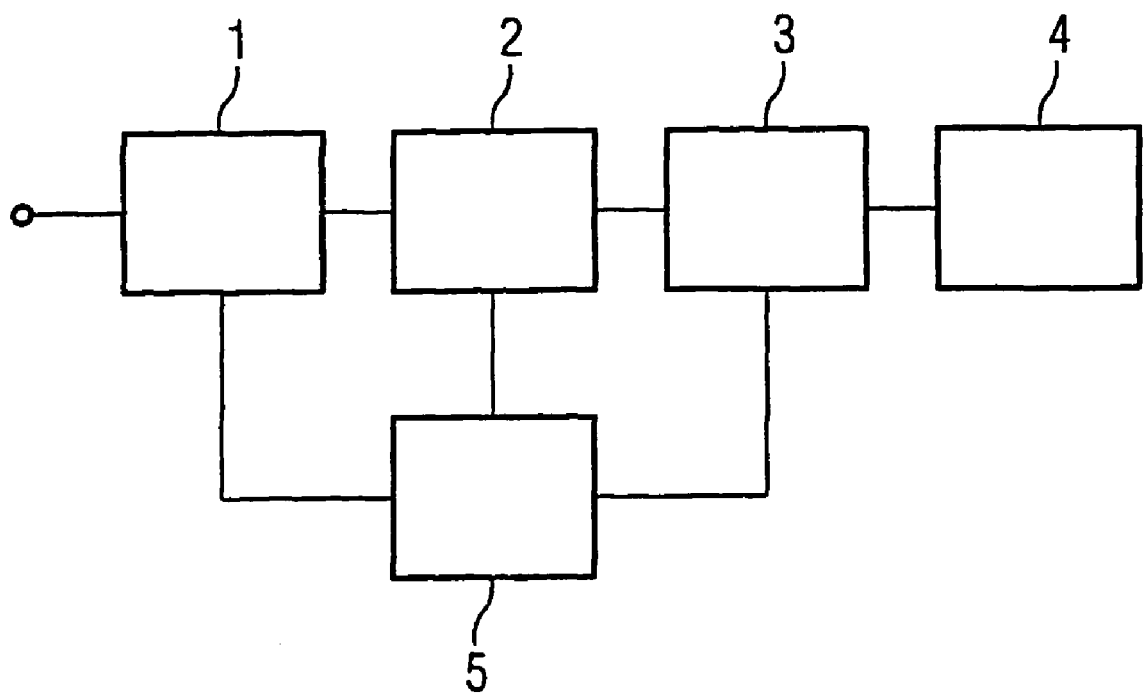
FIG. 1 shows an example of the schematic layout of the test arrangement according to the invention in a node.

As shown in FIG. 1, a node in a communication network receives via a receive/transmit unit 1 the user and control data sent to it. The received data is written to the buffer memory 2, and read out from this by the central control unit 3. The central control unit 3 processes the data under access to a non-volatile memory 4, which contains, for example, address information for forwarding the received messages through the network. A further control unit 5, which is connected to all those units 1, 2, 3 of the node in which a data loss of test messages and/or their responses could occur, or that register such a data loss, performs the periodic testing of the connections to other nodes established by the central control unit 3. The control unit 5 evaluates the connection by means of the response, received via the receive/transmit unit 1, to the test message sent via the connection under test, and, if applicable, initiates clearance of the connection, whereupon the central control unit 3 establishes a new connection via other nodes.

The test method according to the invention is explained below using the example of a periodic link test between two nodes under SSNC (signaling system network control). A node A performs a periodic connection test, for example a "Heartbeat" test, of a stream control transmission protocol (SCTP)/IP connection or an SS7 connection to a node B. The node A sends to node B via the connection under test a signaling link test message (SLTM). The node B receives this test message and acknowledges the received test message with a signaling link test acknowledgement (SLTA). This acknowledgement is received by the node A, but can no longer be saved in the buffer memory 2 because of too many incoming messages at the node, and is discarded.

In node A, the received data is read for processing from the buffer memory 2 by the central control unit 3. The control unit 5 receives a message that a data loss has occurred in the buffer memory 2 during the connection test, and registers the absence of the acknowledgement from the node B to the sent test message within a specified time. The absence of responses to sent test messages is not evaluated, however, and clearance of the connection because of absent responses is not initiated until the end of the overload is indicated by a new message. In the same way, if the test message to be sent is lost in node A before even being sent because of internal faults, and hence does not reach node B, an internal fault is indicated to the signaling link test process in the control unit 5, and clearance of the connection because of the absent responses is not initiated.

Figure 2:
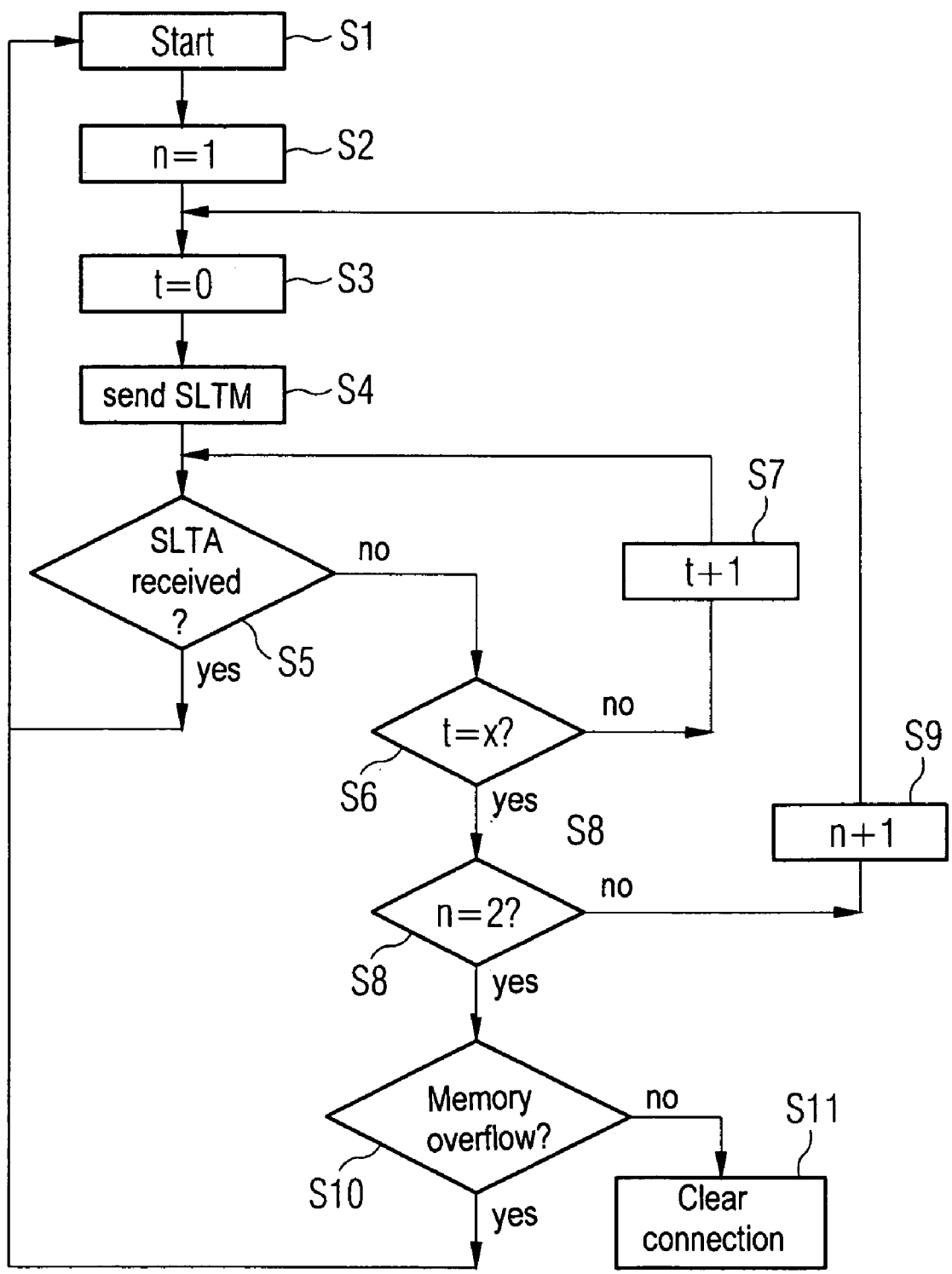
FIG. 2 shows a flow diagram with the test method according to the invention.

FIG. 2 shows an example of the test method according to the invention in a flow diagram. After the start of the connection test in step S1, the parameter n for the test repetition is initialized in step S2, and the parameter t for the wait time in the time-out is reset in step S3. The test message SLTM is sent in step S4, and the receipt of a response SLTA to the test message SLTM is checked in step S5. This check is repeated via a wait loop by means of the steps S6 and S7. If a response is received in step S5 before the time x, the received response is evaluated, if applicable, in order to draw conclusions on, for example, the transmission quality and the data consistency of the connection (not shown), and then the test loop is terminated for a new start in step S1. The expired wait time t, which gives the time period between sending the test message and receiving a response to the test message, can also be used to evaluate the connection. If no response is received before a time x, the parameter n is increased to the value two in step S8, the expired wait time t is reset again in step S3, the test message SLTM is sent again in step S4, and the procedure described of checking for a received response to the re-sent test message is started a second time with the steps S5 to S7. If the result is negative again at the end of the second cycle, the sequence reaches step S10, where a check is made to see whether a memory overflow has occurred in the buffer memory 2, for example. If the check is negative, clearance of the tested connection is initiated in step S11. If, however, it is found in step S10 that a memory overflow has occurred, the test cycle is terminated for a new start in step S1, and clearance of the connection is not initiated.

In the example shown in FIG. 1, the control unit 5 for testing connections is implemented separately in the node. It is also possible, however, for these functions to be performed by the central control unit 3, or integrated in its software. It is also possible within the remit of the invention, for system information from the partner node to be used in addition to the internal system information of the node for the evaluation of a connection or the evaluation of the absence of a response to a sent test message over the connection under test. It is possible, for example, that in node B, the test message sent from node A is lost owing to the large amount of incoming messages at node B, and cannot be acknowledged. If, for example, node B sends to node A a piece of information that a message loss has occurred, this information can be included in the evaluation of the connection in node A, and an unnecessary clearance of the connection can be avoided.

The invention claimed is:

1. A test arrangement in a node of a communication network for testing communication connections to other nodes in the communication network, comprising:
    a transmit unit for sending test messages to a B-node;
    a receive unit for receiving a response from the B-node to the sent test message; and
    a control unit for evaluating the communication connection to the B-node on the basis of the received response and for initiating clearance of the communication connection to the B-node,
    wherein the control unit checks, in the absence of a response from the B-node to the sent test message, whether a data loss has occurred within the node during the test, and does not initiate clearance of the communication connection if a data loss has been detected.

2. The test arrangement as claimed in claim 1, wherein the test message to be sent and/or the received response to a sent test message is saved in a buffer memory, and the control unit checks whether a memory overflow of the buffer memory has occurred during the test.

3. The test arrangement as claimed in claim 2, wherein the control unit additionally checks, in the absence of a response from the B-node to the sent test message, whether a data loss has occurred within the B-node during the test, and does not initiate clearance of the communication connection if a data loss has been detected in the B-node.

4. The test arrangement as claimed in claim 1, wherein the control unit additionally checks, in the absence of a response from the B-node to the sent test message, whether a data loss has occurred within the B-node during the test, and does not initiate clearance of the communication connection if a data loss has been detected in the B-node.

5. The test arrangement as claimed in claim 4, wherein the B-node sends a message to the A-node indicating that a data loss has occurred in the B-node.

6. A test method in a node of a communication network for testing communication connections to other nodes in the communication network, comprising:
    sending a test message to a B-node;
    receiving a response from the B-node to the sent test message;
    evaluating the communication connection to the B-node on the basis of the received response; and
    initiating clearance of the communication connections to the B-node if the evaluation produces a negative result,
    wherein in the absence of a response from the B-node to the sent test message, a check is made to see whether a data loss has occurred within the node during the test, and clearance of the communication connection is not initiated if a data loss has been detected.

7. The test method as claimed in claim 6, wherein the test message to be sent and/or the received response to a sent test message are saved in a buffer memory, and a check is made to see whether a memory overflow has occurred during the test.

8. The test method as claimed in claim 7, wherein in the absence of a response from the B-node to the sent test message, an additional check is made to see whether a data loss has occurred within the B-node during the test, and clearance of the communication connection is not initiated if a data loss has been detected in the B-node.

9. The test method as claimed in claim 6, wherein in the absence of a response from the B-node to the sent test message, an additional check is made to see whether a data loss has occurred within the B-node during the test, and clearance of the communication connection is not initiated if a data loss has been detected in the B-node.

10. The test method as claimed in claim 9, wherein the B-node sends a message to the A-node indicating that a data loss has occurred in the B-node.

* * * * *